US012670656B2

(12) United States Patent (10) Patent No.: US 12,670,656 B2
Tsakok (45) Date of Patent: Jun. 30, 2026

(54) TECHNIQUE FOR GENERATING A BOUNDING VOLUME HIERARCHY

(71) Applicant: Advanced Micro Devices, Inc., Santa Clara, CA (US)

(72) Inventor: John Alexandre Tsakok, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 104 days.

(21) Appl. No.: 18/083,298

(22) Filed: Dec. 16, 2022

(65) Prior Publication Data

US 2024/0203036 A1 Jun. 20, 2024

(51) Int. Cl.
*G06T 15/08* (2011.01)
*G06T 15/10* (2011.01)

(52) U.S. Cl.
CPC .............. *G06T 15/08* (2013.01); *G06T 15/10* (2013.01); *G06T 2210/12* (2013.01)

(58) Field of Classification Search
CPC ....... G06T 15/00; G06T 15/005; G06T 15/08; G06T 15/10; G06T 2210/12
See application file for complete search history.

(56) References Cited

U.S. PATENT DOCUMENTS 11,158,112 B1 * 10/2021 Yeo .......................... G06T 17/10
2004/0095343 A1 * 5/2004 Forest ..................... G06T 17/20
345/419

2015/0302629 A1 10/2015 Obert et al.
2016/0292908 A1 10/2016 Obert
2019/0019326 A1 * 1/2019 Clark .................... G06T 17/005
2019/0035139 A1 * 1/2019 Zimmerman .......... G06T 15/06
2022/0051466 A1 2/2022 Doyle et al.
2022/0270319 A1 * 8/2022 Doyle ................... G06T 15/005

OTHER PUBLICATIONS

Havran, Vlastimil. Heuristic ray shooting algorithms. Diss. Ph. d. thesis, Department of Computer Science and Engineering, Faculty of Electrical Engineering, Czech Technical University in Prague (Year: 2000).*
Garanzha, K., et. al., "Grid-based SAH BVH construction on a GPU", downloaded from: https://www.keldysh.ru/pages/cgraph/articles/dep20/pub/2011/garanzga%20text.pdf on Dec. 16, 2022; 2011; 10 pgs.

* cited by examiner

*Primary Examiner* — Peter Hoang

(74) *Attorney, Agent, or Firm* — Volpe Koenig

(57) ABSTRACT

A technique for building a bounding volume hierarchy is disclosed. The technique subdividing a candidate box node based on a resolution to generate a plurality of cells of the candidate box node; identifying a plurality of nodes of a triangle set collection that fit within the cells; generating a plurality of candidate splits based on the plurality of nodes; selecting a candidate split based on a selection criterion to obtain a selected candidate split; and generating child box nodes for a box node of a bounding volume hierarchy under construction, based on the selected candidate split.

20 Claims, 13 Drawing Sheets

1100

| Subdivide candidate box node based on resolution to generate cells |
| --- |

1102

| Identify nodes of triangle set collection that fit within the cells |
| --- |

1104

| Generate candidate splits based on identified nodes |
| --- |

1106

| Select a candidate split based on a selection criterion |
| --- |

1108

| Generate children for the box node based on the selected candidate split |
| --- |

1110

402

404

Scene Geometry
503 →  BVH Builder 501  →  BVH
505

1100

Subdivide candidate box node based on resolution to generate cells

1102

Identify nodes of triangle set collection that fit within the cells

1104

Generate candidate splits based on identified nodes

1106

Select a candidate split based on a selection criterion

1108

Generate children for the box node based on the selected candidate split

1110

TECHNIQUE FOR GENERATING A BOUNDING VOLUME HIERARCHY

BACKGROUND

In image synthesis, ray tracing is utilized to find a nearest intersection of a given ray with a scene where light propagation is simulated.

BRIEF DESCRIPTION OF THE DRAWINGS

A more detailed understanding can be had from the following description, given by way of example in conjunction with the accompanying drawings wherein.

DETAILED DESCRIPTION

A technique for building a bounding volume hierarchy is disclosed. The technique subdividing a candidate box node based on a resolution to generate a plurality of cells of the candidate box node; identifying a plurality of nodes of a primitive set collection that fit within the cells; generating a plurality of candidate splits based on the plurality of nodes; selecting a candidate split based on a selection criterion to obtain a selected candidate split; and generating child box nodes for a box node of a bounding volume hierarchy under construction, based on the selected candidate split.

Figure 1:
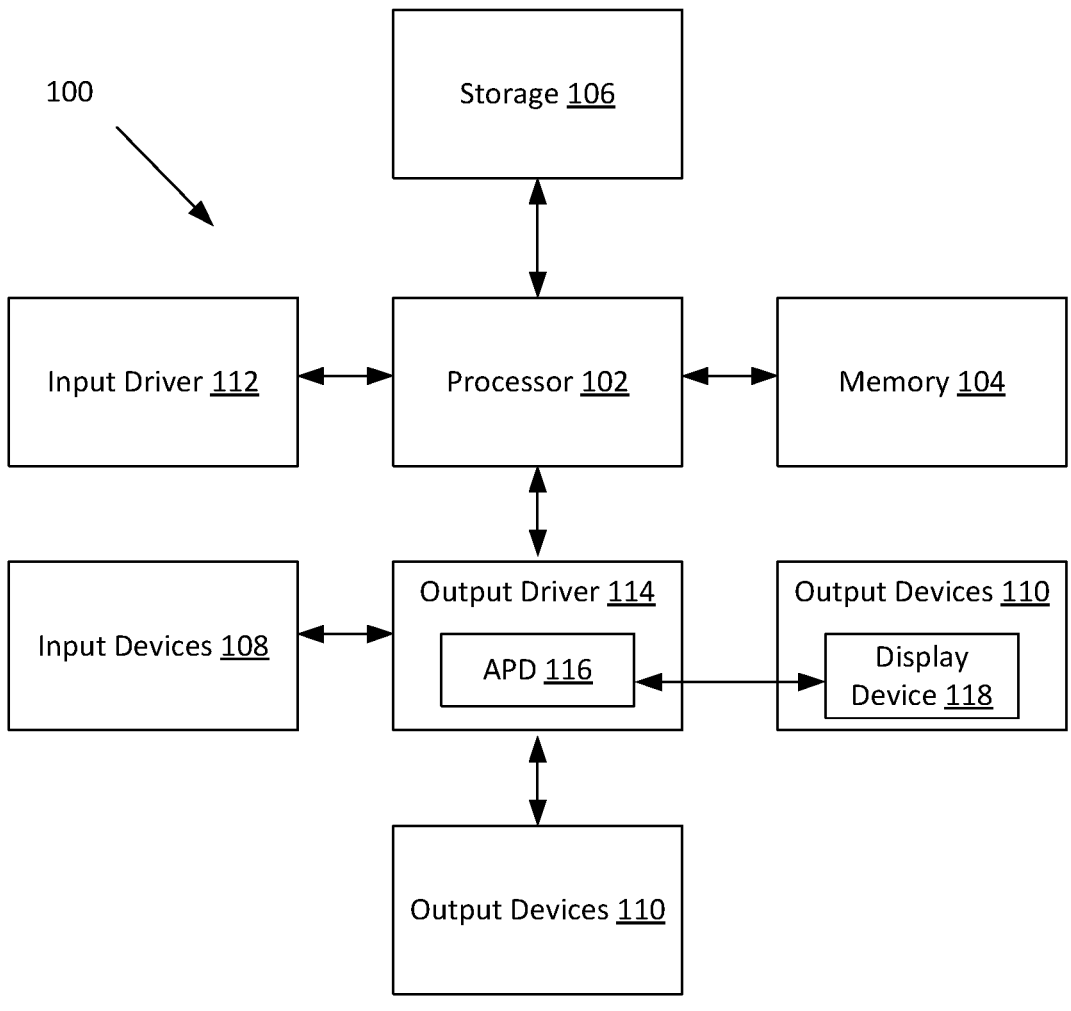
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
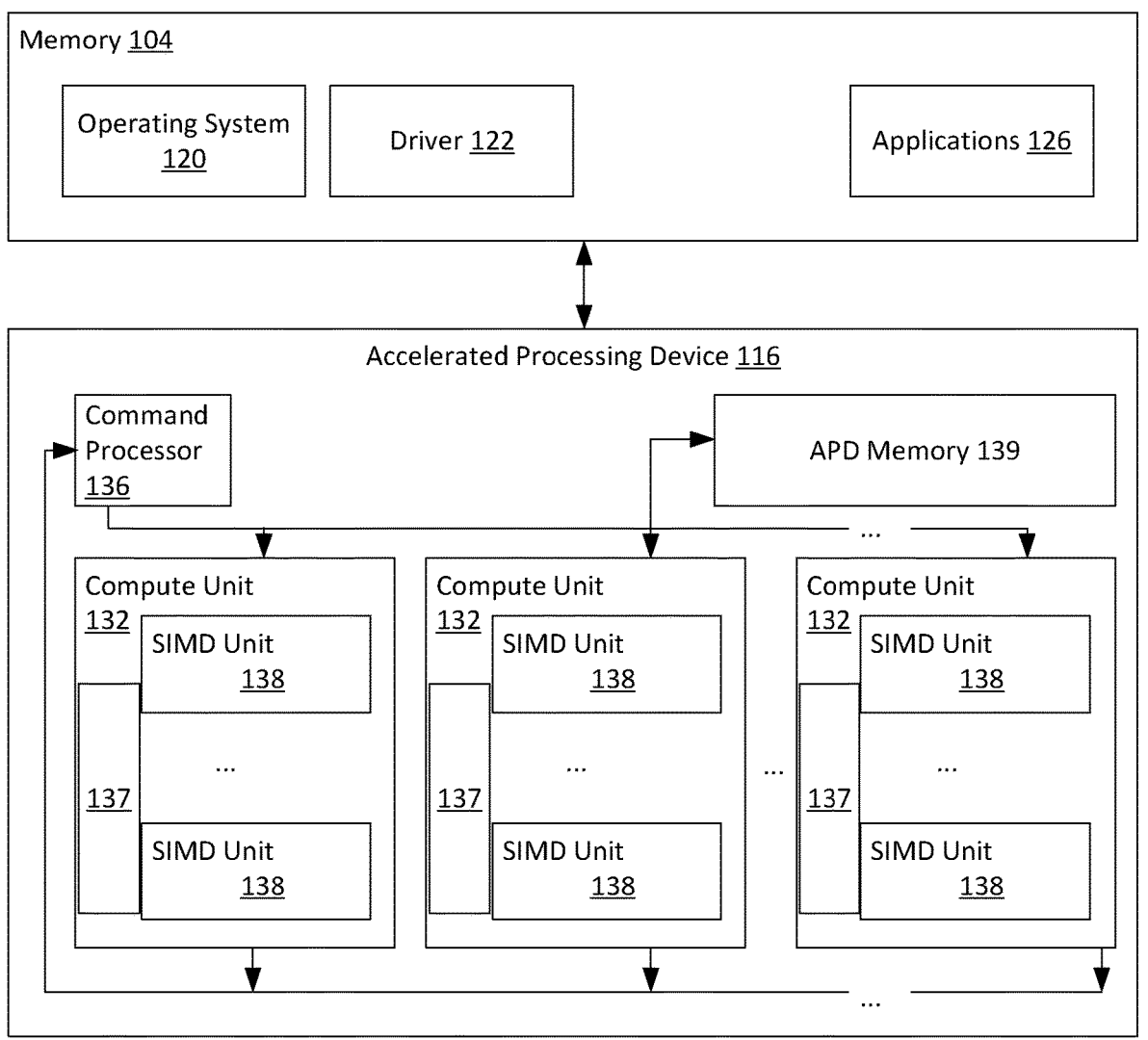
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The compute units 132 are sometimes referred to as "parallel processing units 202" herein. Each compute unit 132 includes a local data share ("LDS") 137 that is accessible to wavefronts executing in the compute unit 132 but not to wavefronts executing in other compute units 132. A global memory 139 stores data that is accessible to wavefronts executing on all compute units 132. In some examples, the local data share 137 has faster access characteristics than the global memory 139 (e.g., lower latency and/or higher bandwidth). Although shown in the APD 116, the global memory 139 can be partially or fully located in other elements, such as in system memory 104 or in another memory not shown or described. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wave-fronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image, divide the image into tiles, execute coarse level tiling for the tiles of the image, divide the tiles into fine tiles and execute fine level tiling of the image. Optionally, the front end geometry processing of a primitive determined to be in a first one of the tiles can be executed concurrently with the visibility pass.

Figure 3:
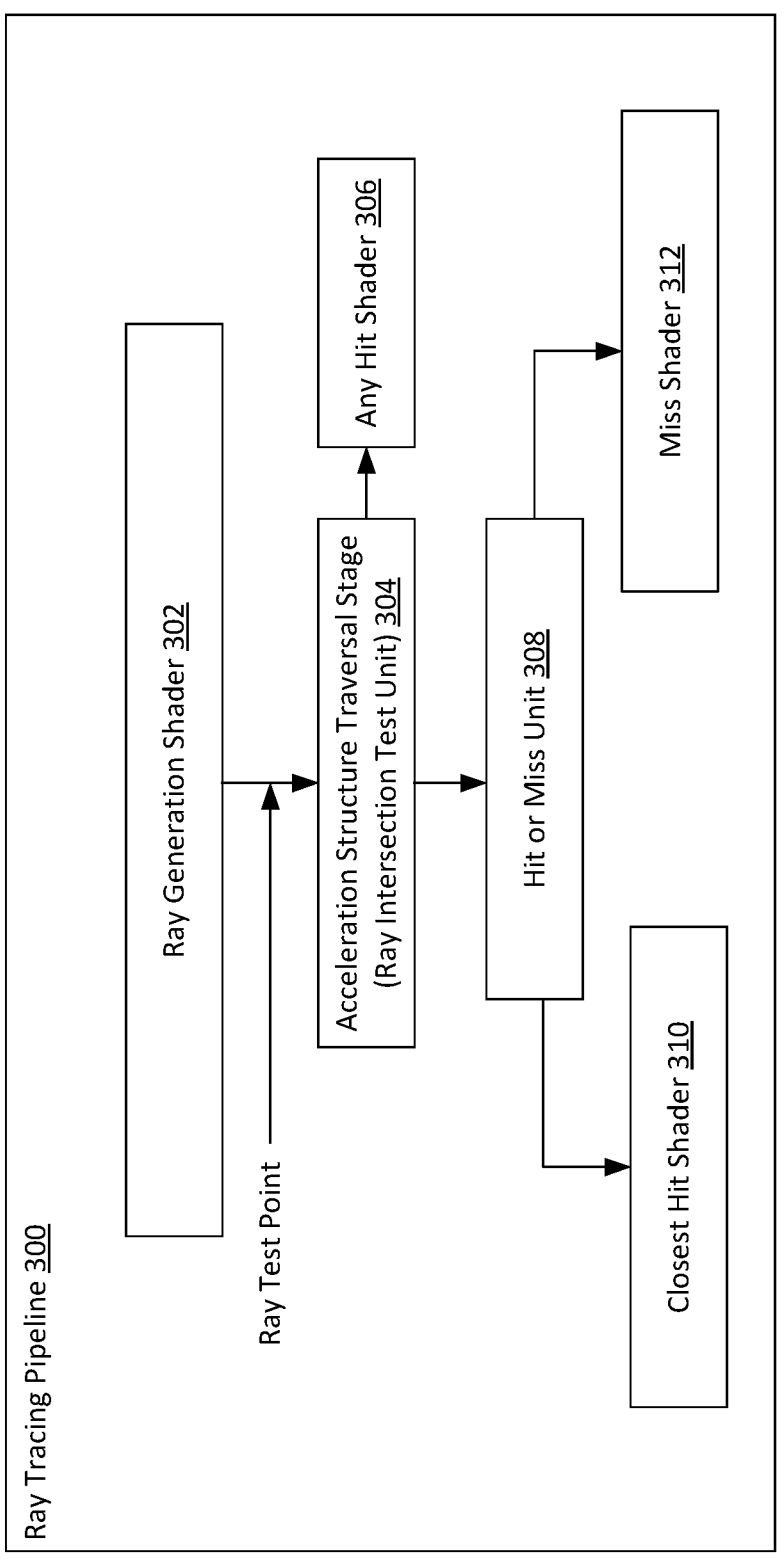
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
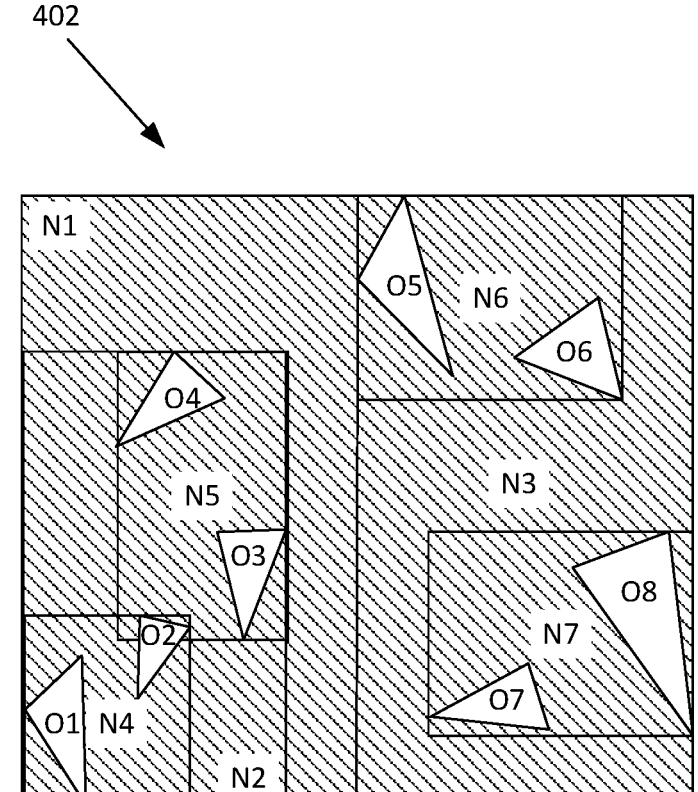
FIG. 4 is an illustration of a bounding volume hierarchy ("BVH"), according to an example.
Figure 4:
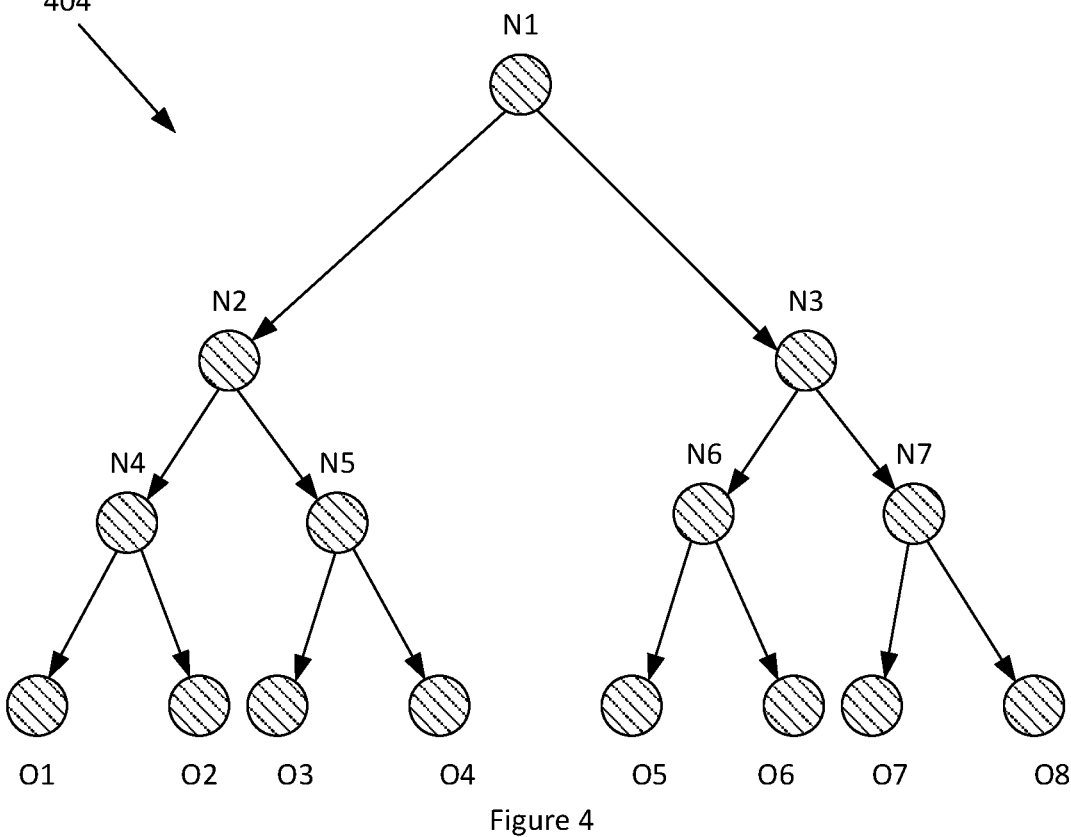

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that No succeeds but $N_7$ fails. The test would test $O_5$ and $O_5$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

FIGS. 1-4 above describe an implementation in which a top-down build for a bounding volume hierarchy may be performed. The top-down build for a bounding volume hierarchy generates a bounding volume hierarchy for a scene, accepting the geometry of the scene (e.g., a collection of triangles) as input and generating a BVH as output. In general, the top-down build involves iteratively generating nodes for the BVH. In each node, candidate splits of triangles in the node are determined and children for the node are determined based on an evaluation of the candidate splits. Additional detail is now provided.

Figures 5, 6A:
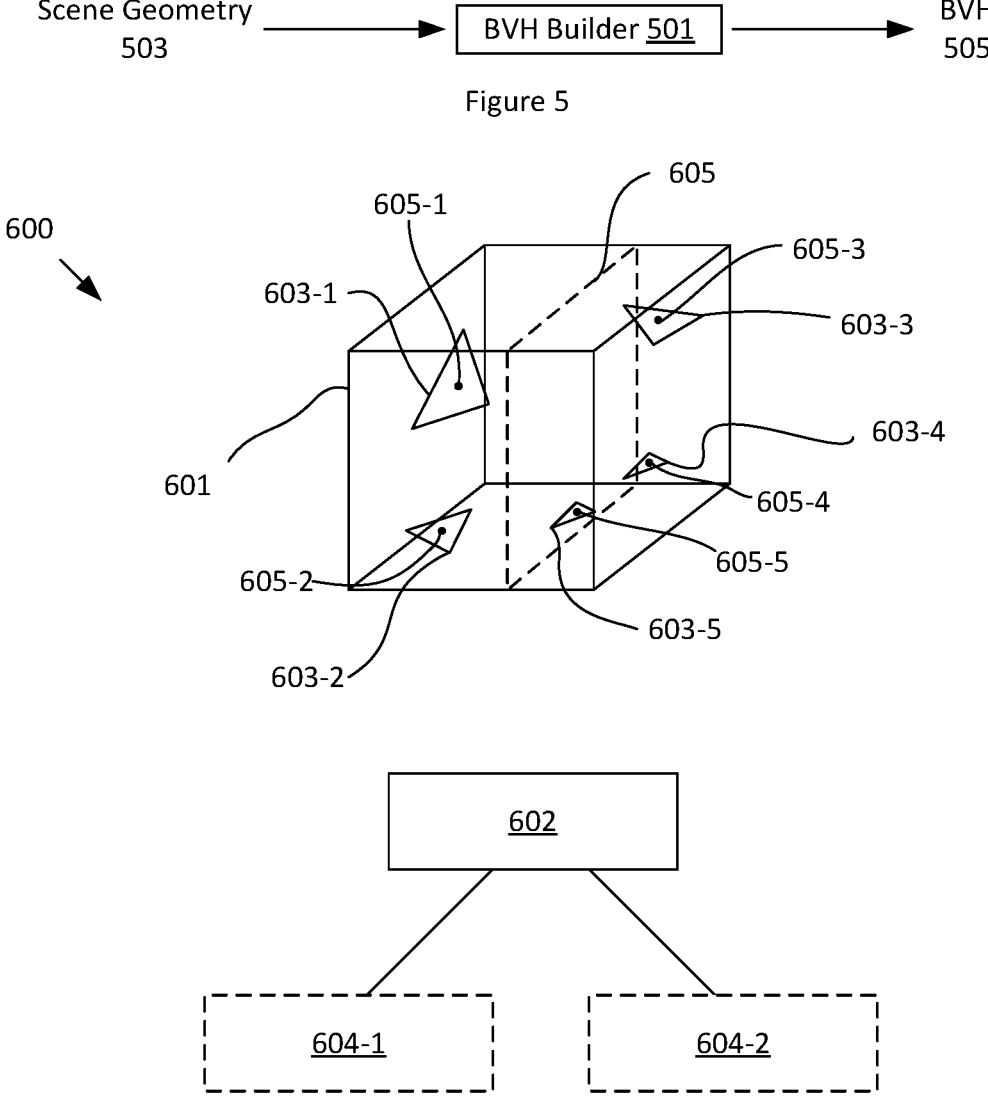
FIG. 5 illustrates generating of a BVH, by a BVH builder, from scene geometry, according to an example.
FIG. 6A illustrates aspects of generating a BVH using a top-down technique, according to an example.

FIG. 5 illustrates generating a BVH 505, by a BVH builder 501, from scene geometry, according to an example. A BVH builder 501 accepts scene geometry 503 and generates a bounding volume hierarchy 505 using a top-down technique. The scene geometry 503 includes geometric objects that correspond to the objects of a scene to be rendered. The BVH 505 is a bounding volume hierarchy that allows for quickly determining whether a ray intersects scene geometry of a scene, as described with respect to FIGS. 1-4. In various examples, the BVH builder 501 is embodied completely in software, completely in hardware (e.g., as circuitry), or as a combination thereof. In different examples, the BVH builder 501 is within the device 100 in which ray tracing is performed or is within a different system. In an example, an application developer creates a scene having geometry and uses a BVH builder 501 to generate a BVH corresponding to that scene, then ships the application to a user for execution. In another example, the application developer uses the BVH builder 501 to generate the BVH corresponding to a scene and also executes the application with ray tracing enabled, using the BVH. In another example, a BVH builder 501 present in the device 100 (e.g., within the APD 116) generates a BVH from scene geometry for an application and then the APD 116 uses the generated BVH to render the geometry of the scene.

Although some example usage scenarios are described, these examples should not be taken as limiting.

FIG. 6A illustrates aspects of generating a BVH using a top-down technique, according to an example. The top-down technique iteratively builds a BVH. The top-down technique begins with a box node that has a bounding volume. In the example geometry 600 of FIG. 6A, a bounding volume 601 bounds triangles 603. Centroids 605 are illustrated for each of the triangles. Centroids represent vertex positions that characterize the position of a triangle. In some examples, a centroid of a triangle is the intersection point between lines that bisect each edge and terminate at the opposing vertex to that edge.

For a given box node (e.g., root node 602 or box node 604), the BVH builder 501 identifies a set of candidate splits for the bounding volume of that box node, evaluates all the candidate splits to determine a cost metric for each candidate split, and selects one of the candidate splits based on a comparison of the cost metrics. Any technically feasible cost metric can be used. In some examples, the cost metric is the sum of the area of the faces of the tightly fitting bounding box for the triangles of each portion of the candidate split and in other examples, other cost metrics are used, such as cost metrics based on bounding volume surface areas for the bounding boxes for the portions of the candidate splits. In an example, if a candidate split defines a first set of triangles and a second set of triangles, a bounding box that tightly bounds each set is formed. Then, the area of each face of each bounding box is determined, and thus sum of those areas is determined for each bounding box and summed together. This metric is the cost metric and is generated for each candidate split. Then, the smallest such cost metric indicates which split should be selected. Again, although a specific cost metric is described, any technically feasible cost metric for selecting a candidate split is possible.

The selected candidate split indicates which triangles, of the triangles within the bounding volume 601 of the box node, are to be included in each of the child box nodes 604. More specifically, the candidate split defines which geometric portions of that bounding volume 601 are associated with which child box nodes 604. Each child box node 604 is assigned a different geometry portion.

In the example of FIG. 6A, a selected candidate split 600 indicates that one side of the split includes triangle 603-1 and triangle 603-2, and that the other side of the split includes triangle 603-3, triangle 603-4, and triangle 603-5. Thus, in this example, one child box node 604 of the root node 602 is generated with a bounding box that bounds the triangles of the one side (603-1, 603-2), and another child box node 604 of the root node 602 is generated with a bounding box that bounds the triangles of the other side (603-3, 603-4, 603-5).

Figure 6B:
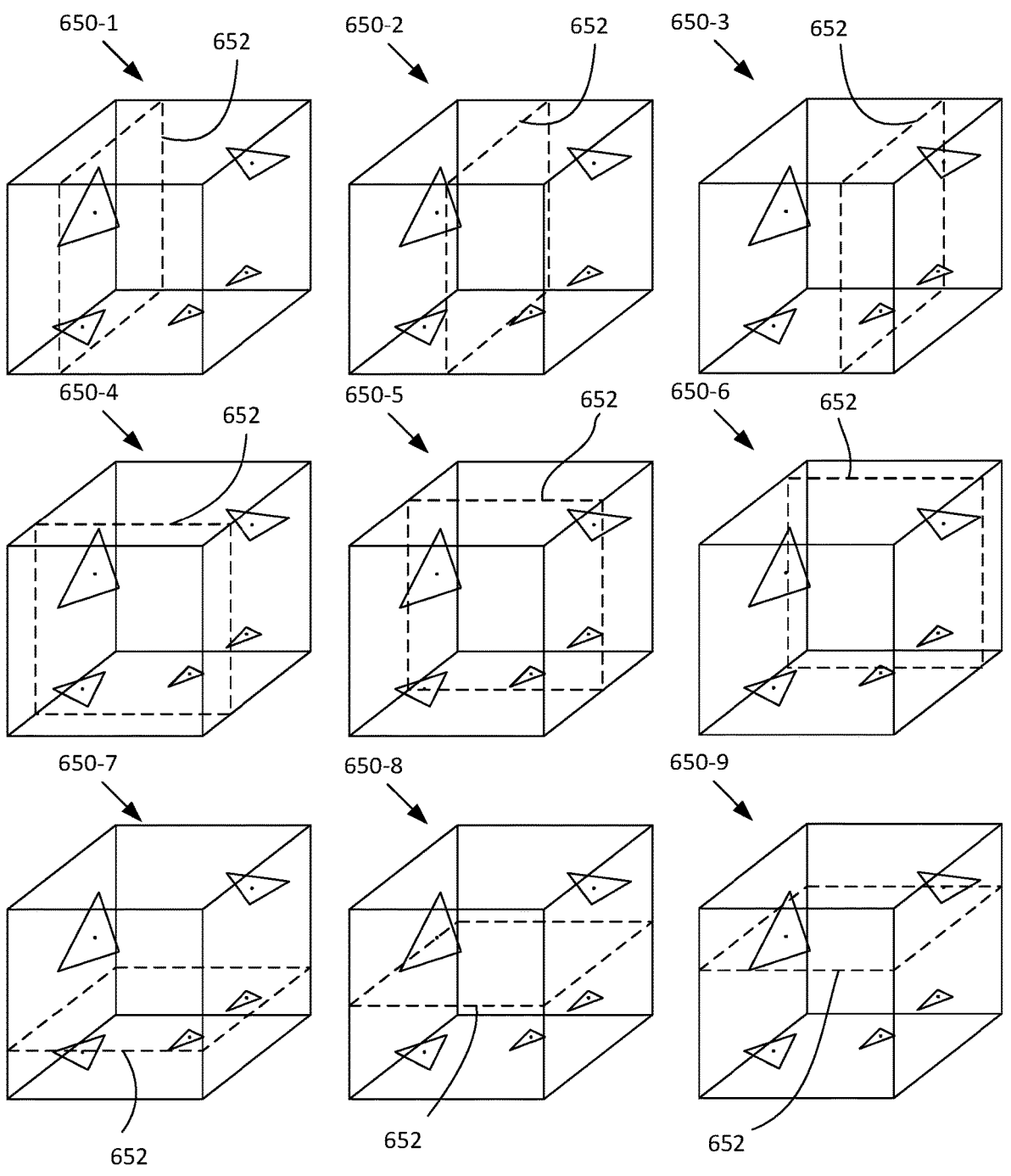
FIG. 6B illustrates a set of candidate splits for a BVH node, according to an example.

FIG. 6B illustrates a set of candidate splits for a box node, according to an example. Nine candidate splits are illustrated —650-1 through 650-9. In each candidate split, a different boundary 652 between different sides of the split is illustrated. It can be seen that different sets of triangles fit within different sides of each candidate split. Thus for each candidate split, different sets of triangles would be included in different bounding boxes. Consequently, each different candidate split represents a different way to subdivide the triangles between the children of the box node. Further, each set of triangles in each side of each candidate split is associated with a different bounding volume. Thus, each candidate split has children with different bounding boxes. Although a technique is described in FIG. 6B for grouping primitives based on location in three-dimensional space, it is possible for other techniques to be used to group primitives together. Such other techniques may or may not consider position and/or extents of such primitives and may additionally or alternatively consider other aspects of such primitives, such as primitive size.

FIG. 6B illustrates nine different candidate splits. This number is small for clarity of illustration. It is possible, however, to have an extremely large number of candidate splits. For example, three candidate splits 650-1, 650-2, 650-3 are shown that divide the geometry in a horizontal direction at three different points, a typical bounding volume hierarchy could include an enormous number of triangles. For such bounding volume hierarchies, the number of possible candidate splits could be very high. In addition to the above, in a naive approach to building a top-down bounding volume hierarchy, for each candidate split, the BVH builder 501 must access each triangle to identify which side of the split that triangle falls within. In this naive approach, this determination must be made for each node and for each candidate split, resulting in a high number of calculations that must be performed. This means that building a bounding volume hierarchy in a top-down manner is potentially very time-consuming.

For at least these reasons, a technique is provided herein that helps to reduce the amount of time required to build a BVH in a top down manner. In general, the technique includes, prior to building a BVH, pre-defining triangle sets at different levels of detail, and centroid boxes for each triangle set. In general, the sizes of the centroid boxes for a triangle set at a particular level of detail is different than the size for the centroid boxes of a triangle set at a different level of detail, although the actual sizes of these centroid boxes varies based on the actual geometry within each triangle set. As described above, the technique includes generating centroid boxes for each triangle set. The centroid box is a box that bounds the centroids of the triangles of the triangle set. Note that the centroid box of a triangle set is generally smaller than the bounding volume of the triangle set, since the bounding volume bounds the full geometry of the triangles, while the centroid box of the triangle bounds the centroids of the triangles. The result of the above is a data structure (sometimes referred to herein as a "triangle set collection") that includes a plurality of levels of detail where each level of detail has a triangle set. Each triangle set specifies bounding boxes that bound triangles of that triangle set as well as centroid boxes that bound the centroids of those triangles. Although a "triangle set collection" is sometimes described herein, in some examples a "primitive set collection" could alternative be used. Any instance of the term "triangle set collection" can be replaced with "primitive set collection" in this document. A primitive set collection is similar to a triangle set collection except that instead of triangles, a primitive set collection has primitives. Primitives are broader than triangles and include triangles or other geometry that could be found at the leaf nodes of a BVH. Such other geometry includes procedurally defined geometry, which is geometry for which intersection between that geometry and a ray is determined based on execution of a shader program or through some other technique. Other geometry can also include primitives that are not procedural but that are not triangularly shaped. The primitives of a primitive set collection do not include the bounding boxes found in box nodes of a BVH. In addition to the above, where triangles are described herein, such description also applies to non-triangle primitives. In other words, the word "triangle" can be replaced with the word "primitive" herein.

The triangle set collection allows for a top-down creation of a BVH with certain speedups. More specifically, as described above, in a naive implementation of a top-down approach for every node, for every candidate split, the BVH builder must determine where each triangle is placed within that candidate split (i.e., which side of the split the triangle falls on). Thus, the BVH builder must iterate through each triangle for each candidate split in such an implementation. Building the triangle set collection with the information described above allows the determination of which side of a candidate split to be made on for each BVH node of a BVH under construction, rather than each triangle, by determining which side of such candidate split each centroid box lies on. By having a constant number of such centroid boxes, the time complexity of the BVH is reduced, since instead of iterating over the number of triangles, the BVH builder iterates over a constant number of centroid boxes. In other words, by pre-building a a triangle set collection having centroid boxes, and then determining which side each centroid box falls within, instead of which side the individual triangles fall on, the amount of time required for the BVH build is reduced. It is true that the triangles initially need to be placed into the centroid boxes, however this processing occurs in the beginning of the BVH build, rather than for each node of the BVH being built. Thus, instead of determining which triangles fall within each side of a split for each node of the BVH being built, it is determined which centroid boxes fall within each side for each node of the BVH being built. The improvement in time complexity comes from the fact that, evaluating all triangles for each node scales in time to a greater degree than evaluating candidate sets for each node. Specifically, once a triangle set collection is built, a fixed number of centroid boxes exists within such triangle set collection. Thus, the number of items that are evaluated for placement in the sides of the candidate splits for the BVH under construction is constant. On the other hand, in the naive implementation, the number of items that are evaluated is not constant—that number scales with the number of triangles to be represented by the BVH under construction. Because time complexity is an expression of how much time is consumed by an algorithm as a function of the number of objects processed by that algorithm, time complexity for an algorithm that replaces a variable number of items (triangles) with a fixed number of items (centroid boxes) is lower. It should be understood that the centroid boxes can include multiple triangles, and there can be a deterministic number of centroid boxes, so that the number of centroid boxes can be fixed rather than varying based on the number of primitives. Additional details are now provided.

Figure 7:
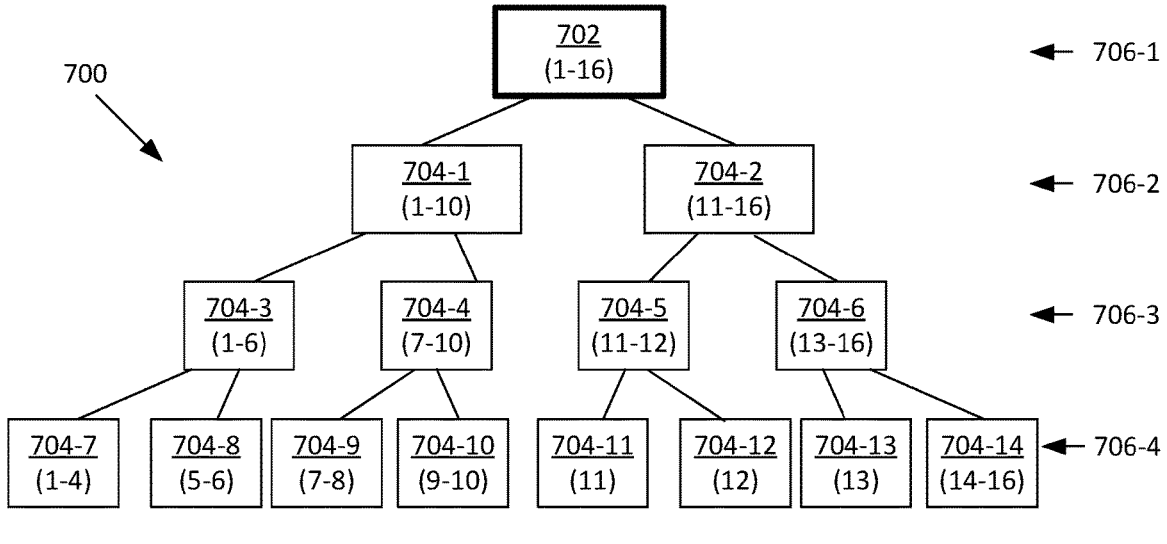
FIG. 7 illustrates an example primitive set collection.

FIG. 7 illustrates an example triangle set collection 700. The triangle set collection 700 includes a number of box nodes 704. The root node 702 is also a box node 704. Each box node is a triangle set. Thus, each box node has an associated set of triangles, an associated bounding volume, and an associated centroid box. For a given box node, the associated triangles are shown below the reference number 704. For example, box node 704-1 is associated with triangles 710 1 through 10. Thus, box node 704-1 has a bounding volume that bounds all of triangles 1 through 10 and box node 704-1 has a centroid box that bounds all centroids of triangles 1 through 10. In some examples, the phrase "bounds" as used herein means bounds the objects mentioned tightly, meaning that the box is large enough to enclose all of the mentioned items, but not larger than that.

It should be understood that the illustrated triangle set collection 700 is, itself a BVH. This BVH is used to build a different, more performant BVH. In other words, the technique described herein generates a first BVH that is used to spatially categorize the triangles of a scene, and the spatial classification from this first BVH is used to assist with generating a second, more performant BVH that is the ultimate result of the technique. In some examples, the first BVH 700 is built using a relatively simple BVH building algorithm, such as parallel linear BVH ("LBVH"). Any BVH building algorithm could be used to generate the BVH that is used to generate the triangle sets used for the BVH building technique of the present disclosure as long as there are no overlaps in centroid boxes for each split. In other words, the BVH building technique of the present disclosure can be thought of as a means for refining a different BVH to be a more performant BVH. It should be understood that the topology of a BVH can greatly affect the performance of traversal of the BVH. Parallel linear BVH is particularly suited for generating the first BVH as parallel linear BVH generates a BVH in a manner that is based on a virtual grid of centroids using Morton codes. For this reason, the centroid boxes used for primitive sets are integer based bounding boxes made from Morton codes which forms a virtual grid. This aspect allows the centroid box extents corresponding to each bounding box of the LBVH and the primitives that fall within such centroid boxes to be easily calculated. In other words, the LBVH defines a grid where each cell corresponds to a different integer Morton code value. Further, the centroid of any particular primitive has one of such integer Morton code values. Thus, it is easy to determine which centroid box a primitive falls within and thus it is easy to generate centroid boxes, for each bounding box of the LBVH, that indicate the extent of the centroids within such centroid boxes. Although an example of generating triangle sets by building a BVH is described, the technique presented herein is not limited utilizing triangle sets generated from a BVH.

The levels 706 of the BVH represent different levels of detail of the triangle sets. For example, level 706-1 represents a higher level of detail than level 706-2. Again, in general, levels of a higher level of detail include more triangles and are generally larger than levels of a lower level of detail.

Referring now to generation of the second, more performant BVH, as described with respect to FIG. 6A, building such a BVH in a top-top manner involves iteratively generating children for BVH nodes of that BVH by evaluating candidate splits for the triangles bounded by that box node. In an example, the BVH builder 501 generates children for a box node of a BVH that is under construction (e.g., box node 602). To perform this operation, the BVH builder 501 identifies the triangles within the bounding volume of that box node 602 and generates a plurality of candidate splits for those triangles. Each candidate split indicates a certain number of "sides" and the triangles that belong on each side. The BVH builder 501 selects a candidate split as an accepted split and generates a child of the box node for each of the sides of the accepted split. The BVH builder 501 then continues performing these operations to generate a full BVH. For example, the BVH builder 501 generates children for the newly generated box nodes in a similar manner as generating children for the root node 602, and so on. In some examples, the BVH builder 501 stops generating when the BVH is complete.

As described above, generating a BVH includes determining which triangles fit within each candidate split. In the techniques described herein, these steps are performed by determining which centroid boxes of the triangle set collection are within each candidate split. Because each centroid box includes one or more triangles, determining which centroid boxes are within each candidate split necessarily results in determining which triangles are within each candidate split. In greater detail, for any given BVH node of a BVH under construction, the technique includes determining which centroid boxes fall within each side of the candidate split. The technique then includes selecting a candidate split based on a cost metric and generating child nodes for the BVH node of the BVH under construction based on the candidate split as described elsewhere herein.

Figure 8:
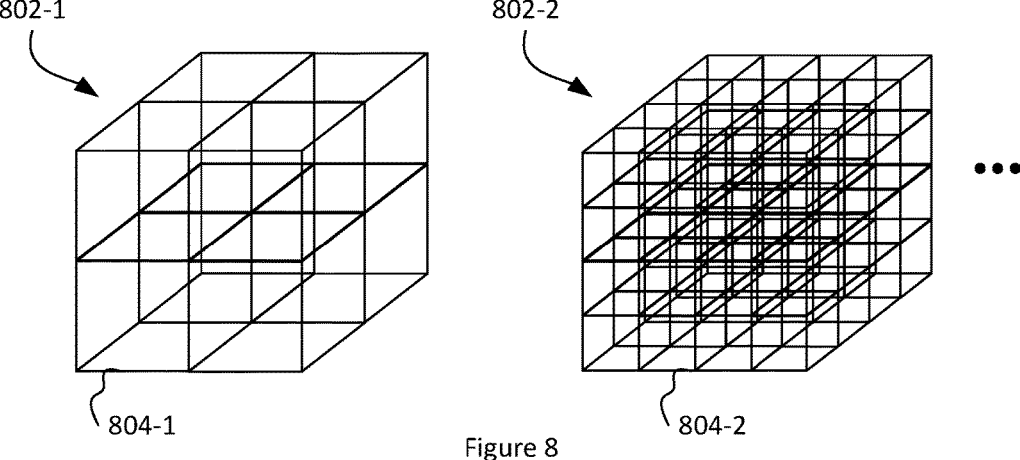
FIG. 8 illustrates different partitioning resolutions, according to an example.

For a given BVH node of the BVH under construction, the BVH builder 501 performs the following operations. The BVH builder 501 determines an appropriate partitioning resolution. A partitioning resolution identifies the size of cells of the centroid box that bounds all centroids of the primitives that descend from the BVH node. The cells define the manner in which the triangle set collection is evaluated to determine which triangle sets fall into which partition of the non-leaf node of the BVH being built, as described in further detail below. FIG. 8 illustrates different partitioning resolutions, according to an example. In a first partitioning resolution 802-1, the size of the cells 804-1 is larger than the size of the cells 804-2 in a second partitioning resolution 802-2.

In some examples, the appropriate partitioning resolution is a tunable parameter provided as input to the BVH builder 501 (for example, by an application execution on the CPU 102 or by another software entity (such as a shader program) or hardware entity (such as hardware within the APD 116). In some examples, this resolution specifies a number of cells by which to partition a centroid box corresponding to a non-leaf node of a BVH being built. Thus, in these examples, the partitioning resolution identifies a number of cells to divide a centroid box corresponding to a box node of the BVH being built into, but does not necessarily specify the absolute size of those boxes. For the given box node of the BVH under construction, the partitioning resolution determines the possible number of candidate splits. More specifically, the boundaries of the cells 804 of the partitioning resolution indicates the boundaries of the candidate splits. In an example, the BVH builder 501 determines a plurality of candidate splits, where each such candidate split has at least one side that is different from all sides of the rest of the candidate splits, and where the boundaries of each candidate split is aligned with the boundaries of the cells 804 of the partitioning resolution. In an example, a candidate split for the partitioning resolution 802-1 can include a bottom side including the bottom four cells 804-1 and a top side including the top four cells 804-1. A different candidate split for that partitioning resolution can include a left side including the left four cells 804-1 and a right side including the right four cells 804-1. For the partitioning resolution 802-2, many more candidate splits can occur. For example, the bottom plane of cells 804-2 can form one side of the split and the top three planes of cells 804-2 can form a different side. Alternatively, the bottom two planes of cells 804-2 can form one side of the split and the top two planes can form another side. A "plane" means the set of cells 804-2 that have the same vertical position (but vary by depth and horizontal position). As shown, it can be seen that the partitioning resolution for a centroid box for which candidate splits are being determined determines the number of possible candidate splits to evaluate. A finer resolution (e.g., partitioning resolution 802-2) results in a greater number of candidate splits and a coarser resolution (e.g., partitioning resolution 802-1) results in a smaller number of candidate splits.

To generate the candidate splits for a candidate BVH node of a BVH under construction, the BVH builder 501 uses the triangle set collection 700. Specifically, the BVH builder 501 traverses down the triangle set collection 700 from the candidate BVH node to find a group of BVH nodes that represents all triangles that are descendants of the candidate BVH node. Each BVH node of the group of BVH nodes has a centroid box that fits within a cell 802 of the selected partitioning resolution 802.

It should be understood that within the triangle set collection 700, box nodes have pointers to child box nodes. Traversing down the triangle set collection 700 means following these pointers. Traversing down the triangle set collection 700 to find the group of BVH nodes means finding the highest BVH nodes 704 whose centroid boxes fit within a cell 802, and also means finding the BVH nodes 704 that, together, "cover" all triangles bounded by the candidate BVH node of the BVH under construction.

Figure 9:
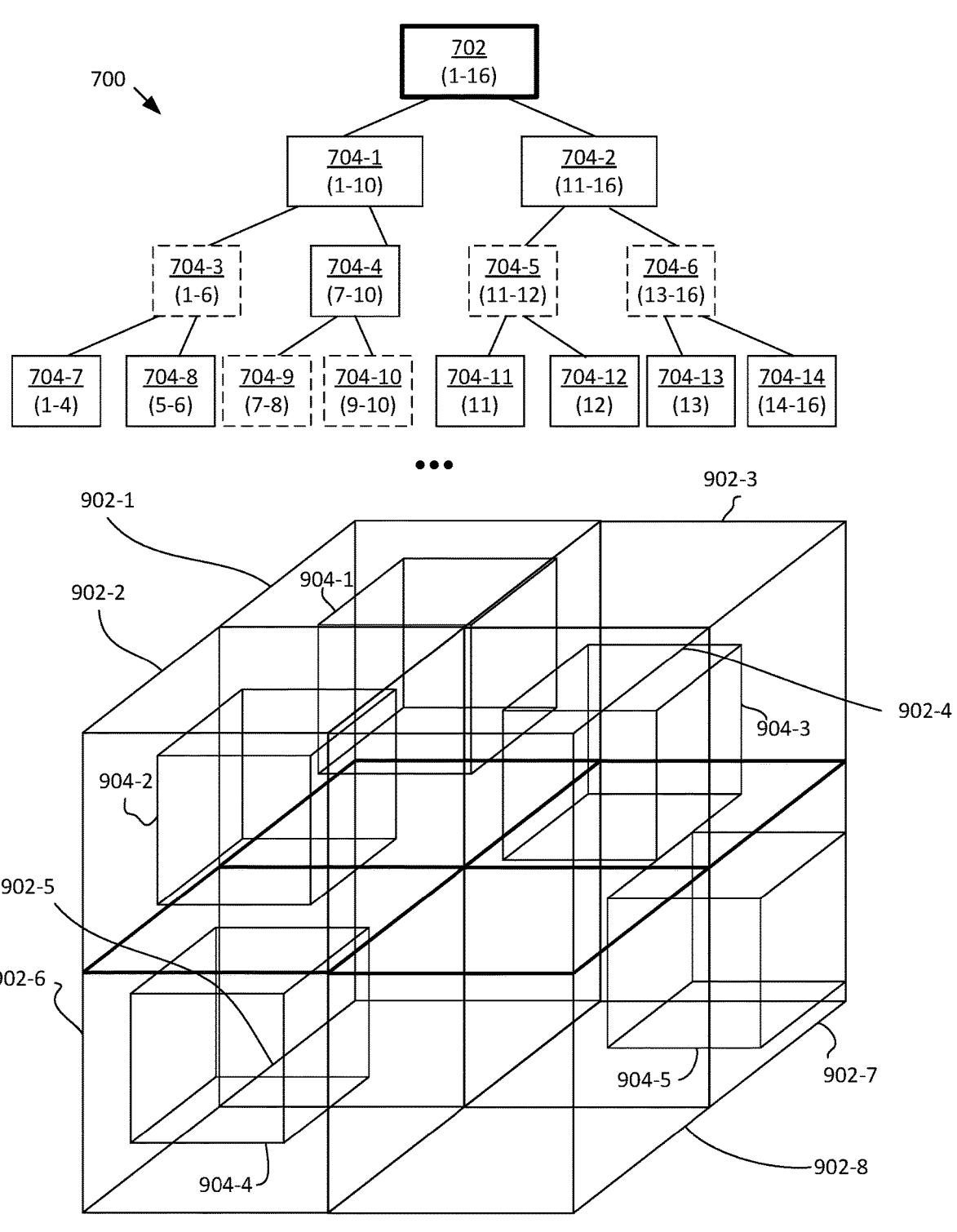
FIG. 9 illustrates an example of finding a group of box nodes of a triangle set collection that corresponds to all primitives that are descendants of a candidate box node of a BVH under construction.

FIG. 9 illustrates an example of finding a group of box nodes that represents all triangles that are descendants of the candidate box node as described above. In this example, the candidate box node is box node 702. The BVH builder 501 searches down the tree for the highest box nodes 704 whose centroid boxes fit within the cells 902 (for a partitioning resolution that has already been chosen, as shown). Further, the BVH builder 501 identifies such box nodes 704 until the set of identified box nodes, together, bound all triangles bounded by the candidate box node 702.

In FIG. 9, the BVH builder 501 examines box node 704-1 and determines that the centroid box (that is, the box that tightly bounds all centroids of all triangles bounded by the bounding volume of the box) does not fit within a single cell 902. The BVH builder 501 examines the two children of box node 704-1, which are box node 704-3 and box node 704-4. The BVH builder 501 determines that the centroid box of box node 704-3 fits within a cell 902 but that the centroid box of box node 704-4 does not fit within a cell 902. The BVH builder 501 identifies the box node 704-3 as one of the group of box nodes that represents all triangles that are descendants of the candidate box node 702. The BVH builder 501 examines children of box node 704-4 and determines that the centroid boxes of box node 704-9 and box node 704-10 each fit within a respective cell 902. Similarly, the BVH builder 501 determines that the centroid box of node 704-2 does not fit within a cell 902, but determines that the centroid boxes of node 704-5 and of node 705-6 fit within respective cells 902. The identified box nodes are 704-3, 704-9, 704-10, 704-5, and 704-6. Additionally, this group encloses all of triangles 1-16, which are all triangles enclosed by the candidate box node 702. The result is a group of identified box nodes of the triangle set collection 700. This group can be used to determine which triangles fit within each candidate split, in a manner that is more performant than if all triangles had to be checked individually.

FIG. 9 illustrates the placement of centroid boxes 904 within cells 902 of the centroid box of the candidate box node 702. Centroid box 904-1 is associated with node 704-3 and fits within cell 902-1. Centroid box 904-2 is associated with node 704-9 and fits within cell 902-2. Centroid box 904-3 is associated with node 704-10 and fits within cell 902-3. Centroid box 904-4 is associated with node 704-5 and fits within cell 902-6. Centroid box 904-6 is associated with node 704-6 and fits within cell 902-7. As can be seen, a set of nodes 704 spanning all triangles that are descendants of a candidate node of a BVH under construction (not shown in FIG. 9) and that fit within cells 902 have been found.

Once the nodes 704 of the triangle set collection that fit within cells for a node of the BVH under construction have been found, it is relatively straightforward to determine which triangles fit within which side of a candidate split. More specifically, because the extents of cells 902 are known, and because candidate splits are defined relative to cell borders, determining which side a set of triangles associated with a particular node 704 of the triangle set collection that fits within a cell is straightforward, since each node 704 has a corresponding centroid box. For example, to determine which side of a candidate split a centroid box fits within, the bounding volume hierarchy generator 501 compares the bounds of the centroid box to the boundaries of the sides of the candidate split, and identifies the side for the centroid box as the side into which the centroid box fits. Thus, for any particular candidate split, it is relatively straightforward to determine the side that is associated with each of the nodes 704 determined to fit within a cell. The relatively smaller number of simpler comparisons involved in this technique is much less work than comparing the actual geometry of each triangle against the boundaries of the sides. This technique can thus lead to similar output as a top-down "binning-based" BVH builder (e.g., one in which the builder evaluates which side of a candidate split each triangle falls within for each box node), but at much less compute cost.

Figure 9A:
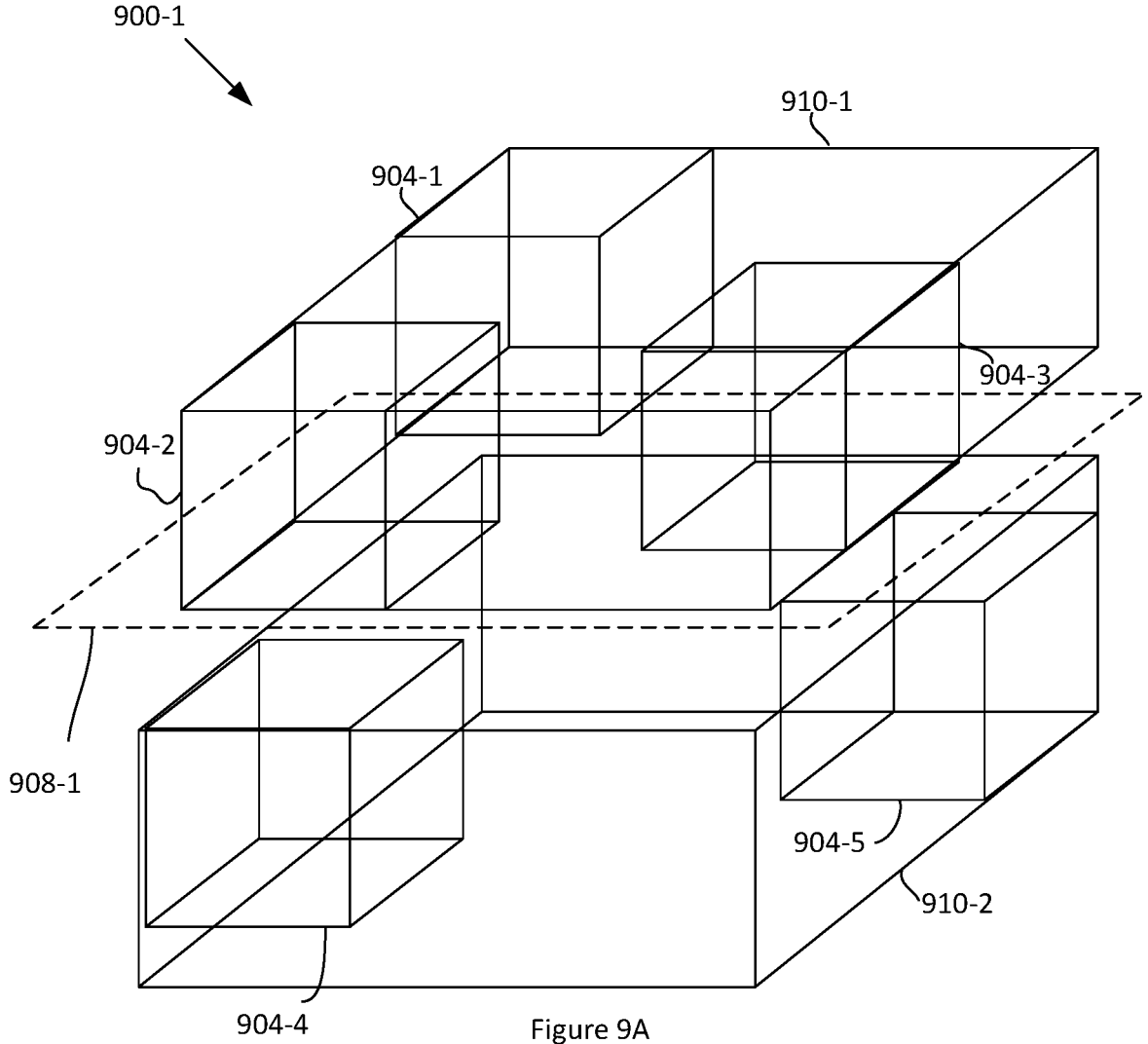
FIGS. 9A-9C illustrate different candidate splits, according to examples.
Figure 9B:
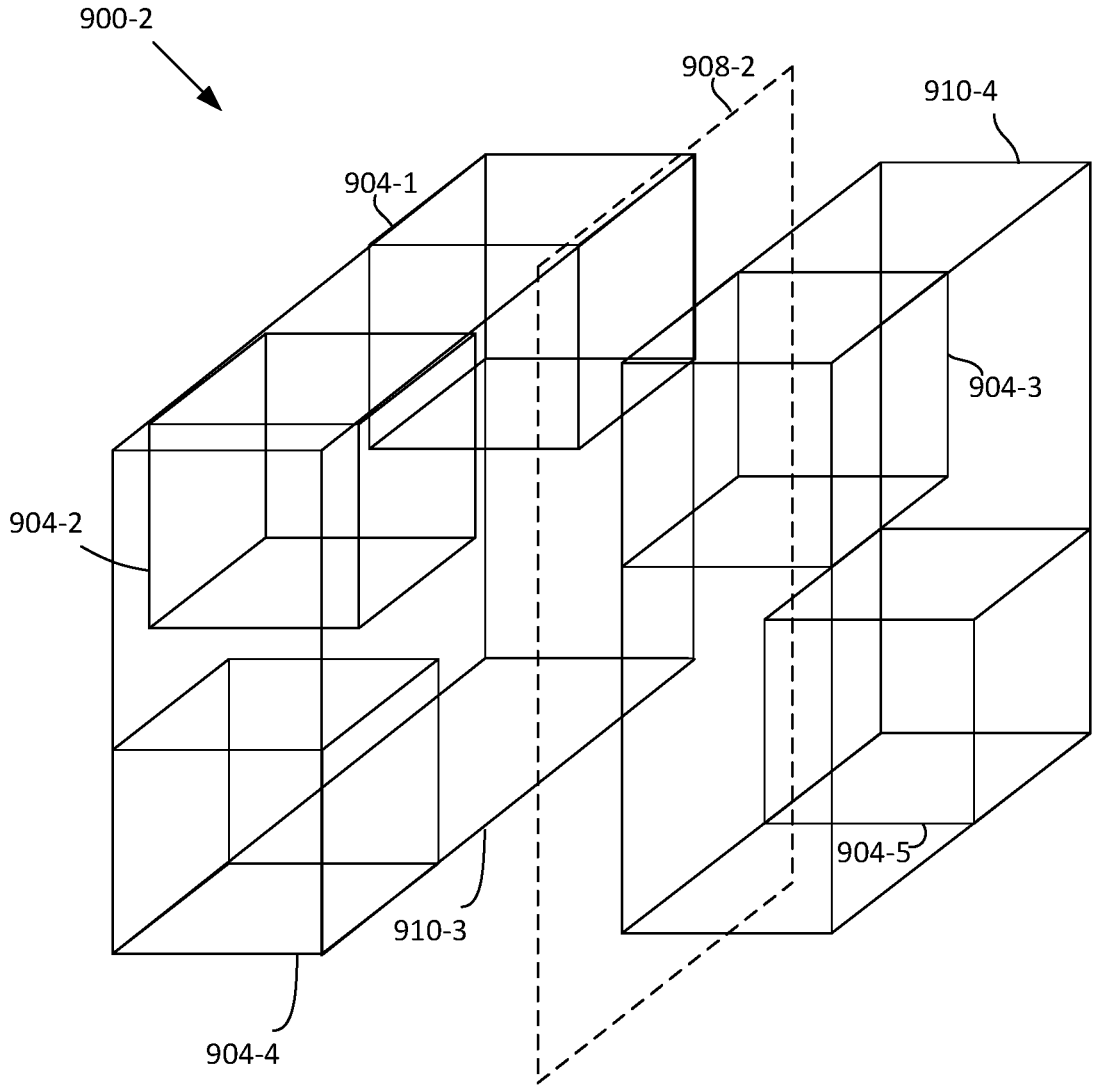
Figure 9C:
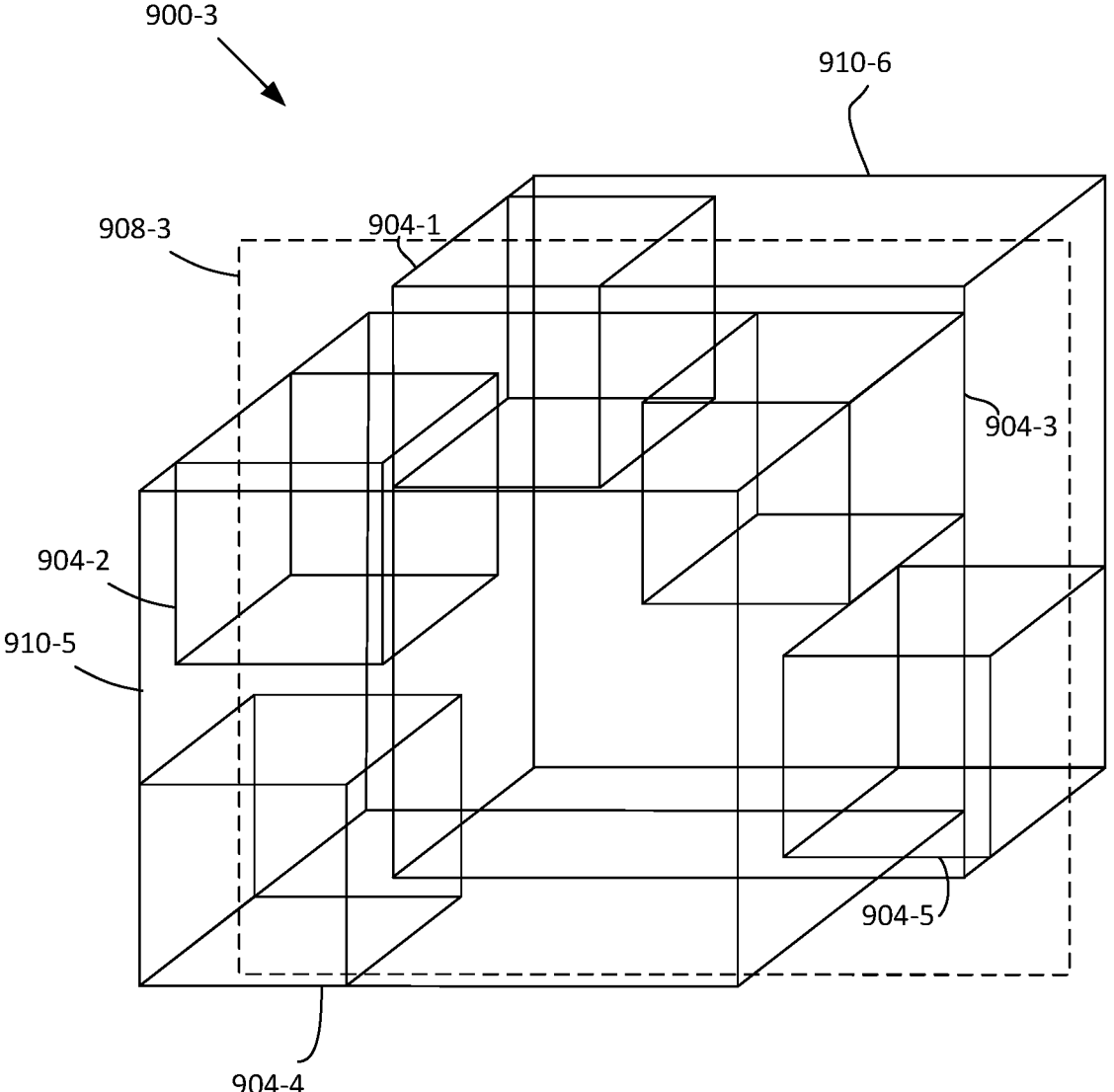

FIGS. 9A-9C illustrate different candidate splits 900, according to examples. In FIG. 9A, a boundary 908-1 splits the geometry into a top side (associated with centroid box 910-1) and a bottom side (associated with centroid box 910-2). The centroid boxes 910 bound the centroids of the centroid boxes 904. The top side includes centroid boxes 904-1, 904-2, and 904-3, and the bottom side includes centroid boxes 904-4 and 904-5. The bounding volume hierarchy generator 501 determines which side the centroid boxes 904 fall within by comparing the extents of the centroid boxes 904 with the boundary 908-1. This determination results in a determination of which side each of the triangles corresponding to the centroid boxes 904 fall within. Thus, it is not necessary to test each such triangle against the boundary 908-1.

In FIG. 9B, a boundary 908-2 splits the centroid boxes 904 as shown, resulting in centroid box 910-3 and centroid box 910-4. Similarly, in FIG. 9C, a boundary 908-3 splits the centroid boxes 904 as shown, resulting in centroid box 910-5 and centroid box 910-6. To determine children for a BVH node corresponding to the geometry of FIGS. 9A-9C, the bounding volume hierarchy builder 501 evaluates these candidate splits 900, selects one candidate split 900 based on selection criteria, and generates child BVH nodes from the sides of the split, as described elsewhere herein.

Figure 10:
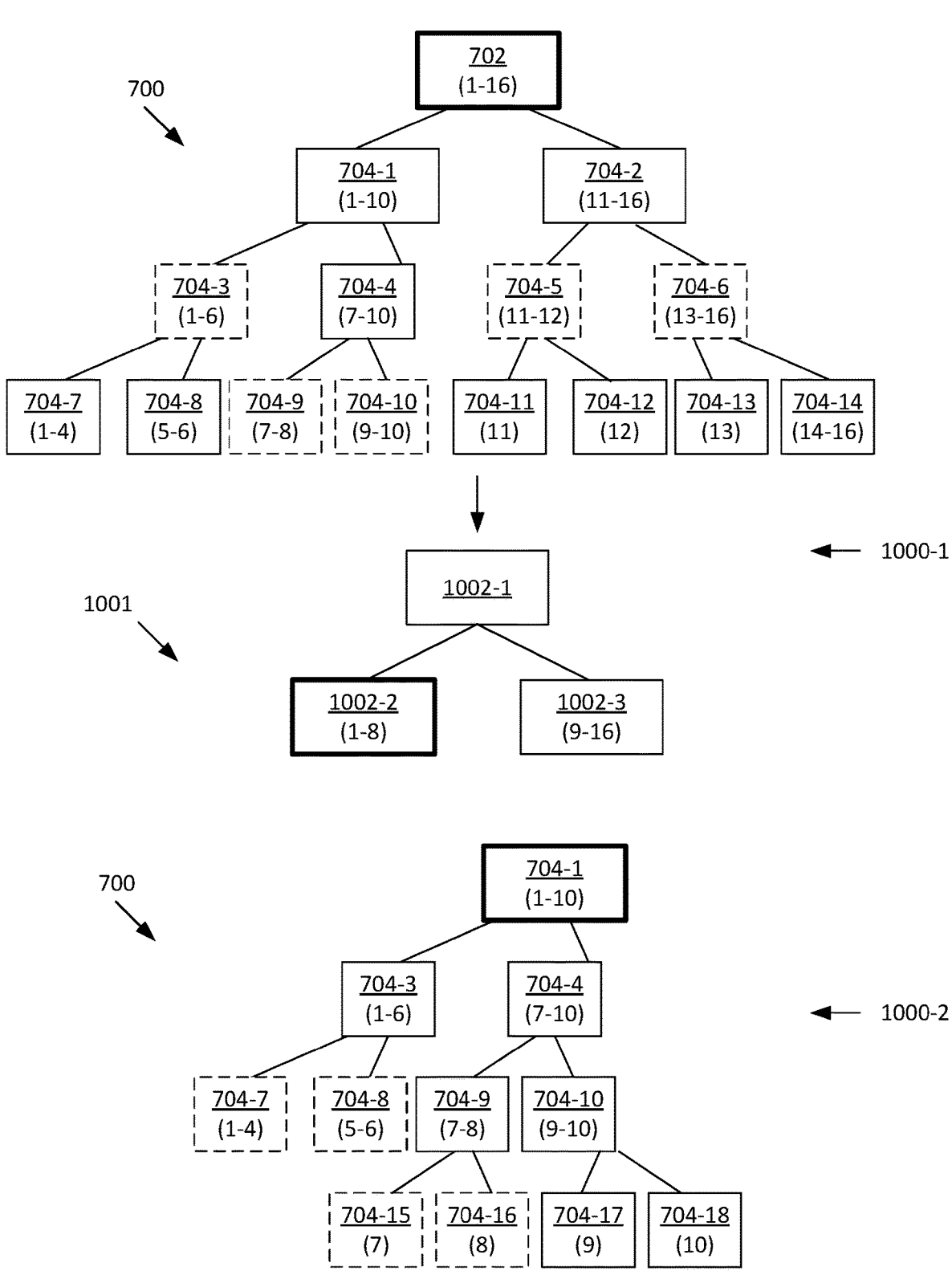
FIG. 10 illustrates additional operations related to building a BVH, according to an example.

FIG. 10 illustrates additional operations related to building a BVH, according to an example. More specifically, FIG. 10 illustrates generation of a BVH under construction 1001 based on a triangle set collection 700 (which is, in some examples, constructed using an algorithm such as LBVH, as described elsewhere herein, and which, in some examples, includes a centroid box at each BVH node 704). Stage 1 1000-1 results in generation of BVH nodes 1000-2 and 1000-3 from BVH node 1002-1. Specifically, the BVH builder 501 begins with the root node 702 of the triangle set collection 700, forming a node 1002-1 in the BVH under construction 1001 based on that root node 702. The node 1002-1 has a centroid box that bounds all centroids of the root node 702 and has a bounding box that bounds all triangles of the root node 702. At this point, the node 1002-1 is the candidate box node for which splits are being generated.

The BVH builder 501 traverses down the triangle set collection 700 to identify the highest nodes 704 whose centroid boxes that fit completely within a single cell 902 (FIG. 9) and that enclose all of the triangles enclosed by the root node 702. In stage 1000-1, the BVH builder 501 has determined that the centroid boxes for each of nodes 704-3, 704-9, 704-10, 704-5, and 704-6 fit within a single cell. As described elsewhere herein, the size of the cell can be a tunable parameter. In some examples, the size of a cell is determined by dividing the centroid box of the candidate BVH node by a resolution parameter, which is or is derived from the tunable parameter. In an example, a resolution parameter specifies that a centroid box should be divided into 64 cells. Thus, different BVH nodes would have different cell sizes. In examples where the resolution parameter is the tunable parameter, the cell size is indirectly determined based on the resolution parameter. It is possible for the tunable parameter to be the same for different levels of the BVH under construction or to be different for different levels. In one example, the tunable parameter is kept constant until a certain level is met and then the cell size is kept constant. Any technically feasible means for setting the tunable parameter to specify the resolution and thus cell size for any particular box node 704 in the BVH under construction 1001 is possible.

The BVH builder 501 generates candidate splits using the identified BVH nodes that fit within a single cell, evaluates the candidate splits, and selects a candidate split based on any technically feasible criteria (e.g., lowest sum of bounding volume surface area). The BVH builder 501 generates children based on this candidate split, with each side corresponding to a new node in the BVH. Each such node has a bounding volume that bounds all primitives of the corresponding side and has a centroid box that bounds the centroids of all primitives that are descendants of that node. In stage 1000-1, the BVH nodes generated include BVH node 1002-2 and BVH node 1002-3.

At stage 1000-2, the BVH builder 501 determines children for BVH node 1002-2, which is now the candidate node. The BVH builder 501 begins with the BVH node or BVH nodes of the triangle set collection 700 that, together, bound all triangles that are descendants of the candidate node 1002-2. In this case, BVH node 704-1 bounds all such triangles. The BVH builder 501 traverses down the triangle set collection 700 to find the highest BVH nodes that fit within a cell for a certain resolution and that, together, enclose all triangles of the candidate node 1002-2. In the example shown, such BVH nodes 704 include BVH nodes 704-7, 704-8, 704-15, and 704-16. The BVH builder 501 generates candidate splits from these BVH nodes, selects one of the candidate splits, and generates children for BVH node 1002-2 of the BVH under construction 1001 according to the selected candidate split. The BVH builder 501 repeats these steps until a completed BVH is built.

Figure 11:
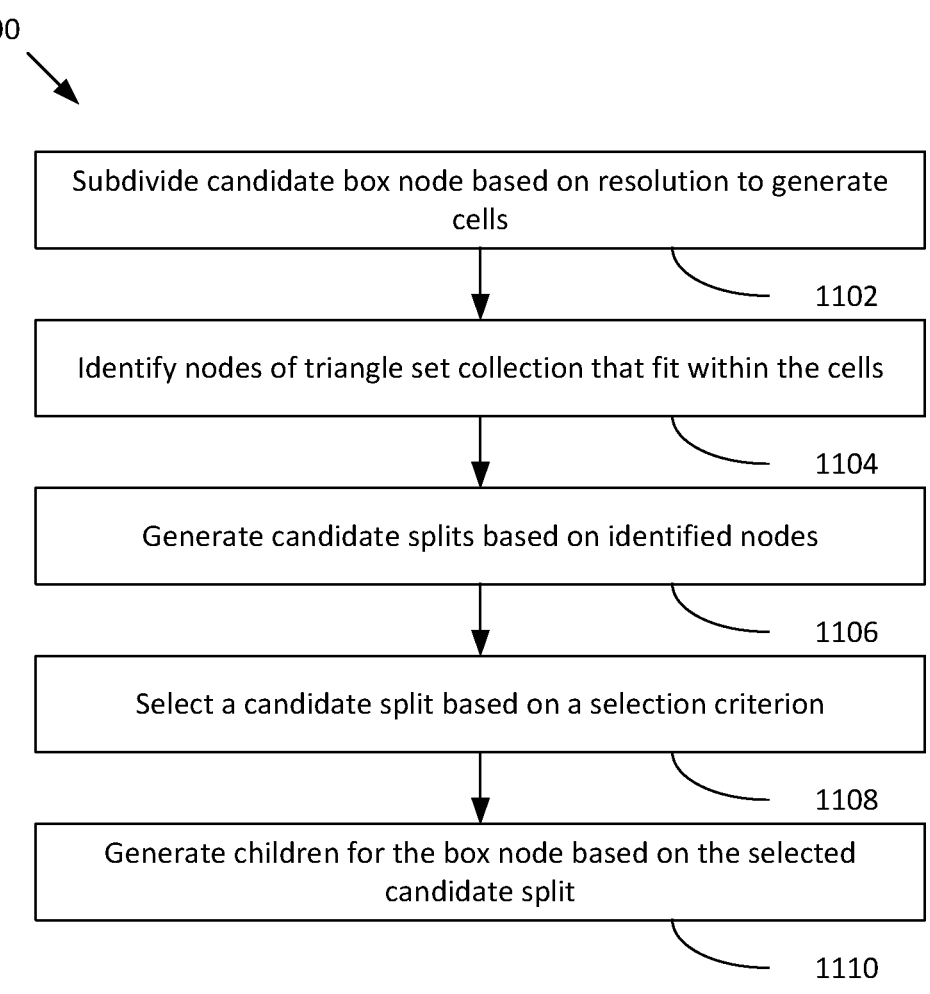
FIG. 11 is a flow diagram of a method for building a BVH according to an example.

FIG. 11 is a flow diagram of a method 1100 for building a BVH according to an example. Although described with respect to the system of FIGS. 1-10, any system configured to perform the steps of the method 1100 in any technically feasible order falls within the scope of the present disclosure.

At step 1102, the BVH builder 501 determines a cell size for a centroid box of a triangle set collection 700 based on a resolution to generate cells. As described above, the resolution may be associated with a tunable parameter that indicates a number of cells into which a box node is be divided.

At step 1104, the BVH builder 501 identifies nodes of a triangle set collection that fit within the cells of the subdivision. More specifically, the BVH builder 501 finds the highest box nodes of the triangle set collection 700 whose centroid boxes fit within the cells of the subdivision.

At step 1106, the BVH builder 501 generates candidate splits based on the identified nodes. Specifically, the BVH builder 501 selects a plurality of boundaries for different candidate splits, where each boundary lies on the faces of the cells. The BVH builder then places the centroid boxes of each of the box nodes identified in step 1104 into a side of the candidate splits by comparing the extents of the centroid boxes to the boundaries. The result for any particular candidate split is an indication of which centroid boxes (and thus which of the nodes identified in step 1104) are on each side of the candidate split.

At step 1108, the BVH builder 501 selects one of the candidate splits based on a selection criterion. In various examples, a selection criterion specifies a manner in which to evaluate the different candidate splits in order to select one that is deemed "optimal." In an example, the selection criterion is the surface area of the bounding volume of the triangle multiplied by the number of primitives for each side.

At step 1110, the BVH builder 501 generates children for the box node of the BVH under construction based on the selected candidate split. Specifically, the BVH builder 501 generates one child for each side of the selected candidate split, where each child has a bounding volume that bounds all geometry of the associated side.

The BVH builder 501 repeats method 1100 any number of times, to build a BVH. After step 1110, the BVH builder 501 selects a node of the BVH under construction to generate child nodes for. Step 1102 for this node would calculate the cell size for divisions of the centroid box. Step 1104 would identify the nodes of the triangle set collection that fall within the cells of the subdivided node and that, together, bound all triangles that are bounded by the subdivided node. The BVH builder 501 would proceed with step 1106, 1108, and 1110, and continue for additional nodes of the BVH under construction.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of building a bounding volume hierarchy, the method comprising:
    generating a primitive set collection that includes an initial bounding volume hierarchy ("BVH") that defines a plurality of nodes, each having bounding volume that bound corresponding one or more primitives, each node defining a centroid box that bounds the centroids of the corresponding one or more primitives;
    subdividing a candidate box node for a BVH under construction based on a resolution to generate a plurality of cells of the candidate box node; and
    generating child box nodes for a box node of the BVH under construction, based on a selected candidate split, which is selected from among a plurality of candidate splits that split the cells of the plurality of cells, wherein each cell bounds a set of highest nodes of the initial BVH whose centroid boxes fit within the cell.

2. The method of claim 1, wherein the resolution indicates a number of cells into which to subdivide the candidate box node.

3. The method of claim 1, further comprising identifying the highest nodes that fit within the cells, including identifying nodes whose centroid boxes fit within a single cell of the cells of the candidate box node.

4. The method of claim 3, wherein the centroid boxes comprise boxes that bound centroids of primitives of a node.

5. The method of claim 1, further comprising generating the plurality of candidate splits by splitting a bounding volume of the candidate box node based on a boundary aligned with the plurality of cells.

6. The method of claim 1, further comprising selecting the candidate split by evaluating a plurality of candidate splits according to a selection criterion and selecting one of the candidate splits.

7. The method of claim 6, wherein the selection criterion is a lowest total bounding box surface area criterion.

8. The method of claim 6, wherein generating the child box nodes comprises generating a child box node for each side of the selected candidate split, where each child box node has a bounding box that bounds each primitive of a side corresponding to the child box node.

9. The method of claim 1, further comprising repeating the generating the primitive set collection, the subdividing, and the generating the child box nodes for multiple box nodes of a bounding volume hierarchy under construction.

10. A system of building a bounding volume hierarchy, the system comprising:
    a memory configured to store a bounding volume hierarchy; and
    a bounding volume hierarchy builder configured to build the bounding volume hierarchy, by performing operations including:
        generating a primitive set collection that includes an initial bounding volume hierarchy that defines a plurality of nodes, each having bounding volumes that bound corresponding one or more primitives, each node defining a centroid box that bounds the centroids of the corresponding one or more primitives;
        subdividing a candidate box node for the bounding volume hierarchy based on a resolution to generate a plurality of cells of the candidate box node; and
        generating child box nodes for a box node of the bounding volume hierarchy under construction, based on a selected candidate split, which is selected from among a plurality of candidate splits that split the cells of the plurality of cells, wherein each cell bounds a set of highest nodes of the initial BVH whose centroid boxes fit within the cell.

11. The system of claim 10, wherein the resolution indicates a number of cells into which to subdivide the candidate box node.

12. The system of claim 10, the operations further include identifying the highest nodes that fit within the cells including identifying nodes whose centroid boxes fit within a single cell of the cells of the candidate box node.

13. The system of claim 12, wherein the centroid boxes comprise boxes that bound centroids of primitives of a node.

14. The system of claim 10, wherein the operations further include generating the plurality of candidate splits by splitting a bounding volume of the candidate box node based on a boundary aligned with the plurality of cells.

15. The system of claim 10, wherein the operations further include selecting the candidate split by evaluating a plurality of candidate splits according to a selection criterion and selecting one of the candidate splits.

16. The system of claim 15, wherein the selection criterion is a lowest total bounding box surface area criterion.

17. The system of claim 15, wherein generating the child box nodes comprises generating a child box node for each side of the selected candidate split, where each child box node has a bounding box that bounds each primitive of a side corresponding to the child box node.

18. The system of claim 10, wherein the bounding volume hierarchy builder is further configured to repeat the generating the primitive set collection, the subdividing, and the generating the child box nodes for multiple box nodes of a bounding volume hierarchy under construction.

19. A non-transitory computer-readable medium storing instructions that, when executed by a processor, cause the processor to perform operations comprising:
    generating a primitive set collection that includes an initial bounding volume hierarchy that defines a plurality of nodes, each having bounding volumes that bound corresponding one or more primitives, each node defining a centroid box that bounds the centroids of the corresponding one or more primitives;
    subdividing a candidate box node for a BVH under construction based on a resolution to generate a plurality of cells of the candidate box node; and generating child box nodes for a box node of the BVH under construction, based on a selected candidate split, which is selected from among a plurality of candidate splits that split the cells of the plurality of cells, wherein each cell bounds a set of highest nodes of the initial BVH whose centroid boxes fit within the cell.

20. The non-transitory computer-readable medium of claim 19, wherein the resolution indicates a number of cells into which to subdivide the candidate box node.

* * * * *